April 10, 1928.
J. BECHTHOLD
1,665,998
STRAWBERRY TOP AND RUNNER CUTTER
Filed Dec. 21, 1926 2 Sheets-Sheet 2
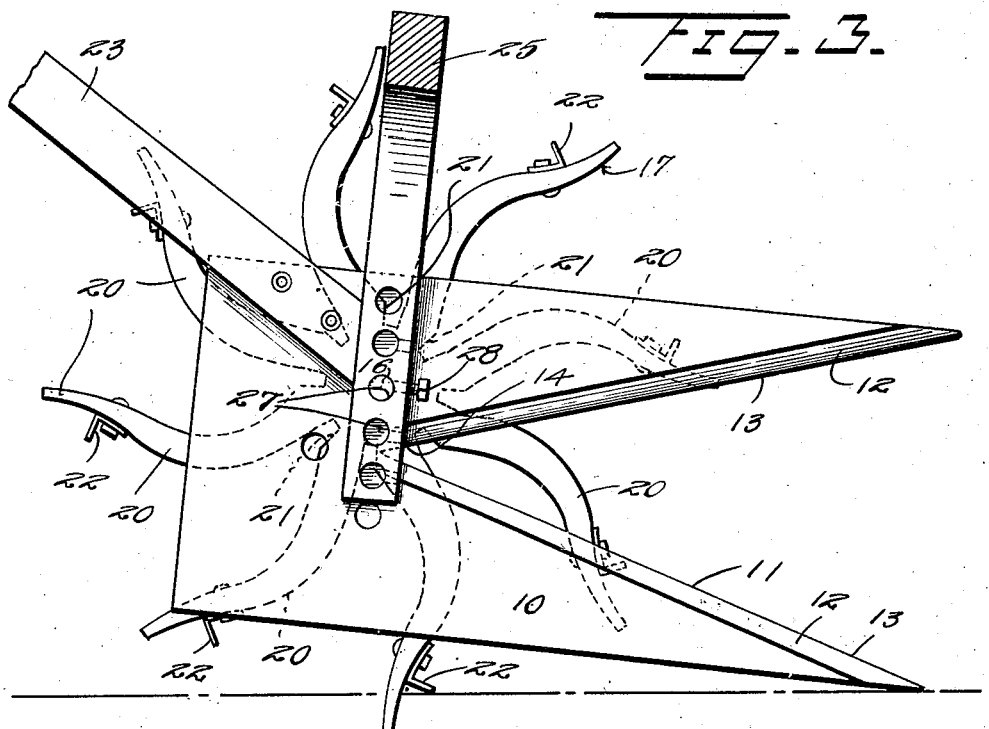
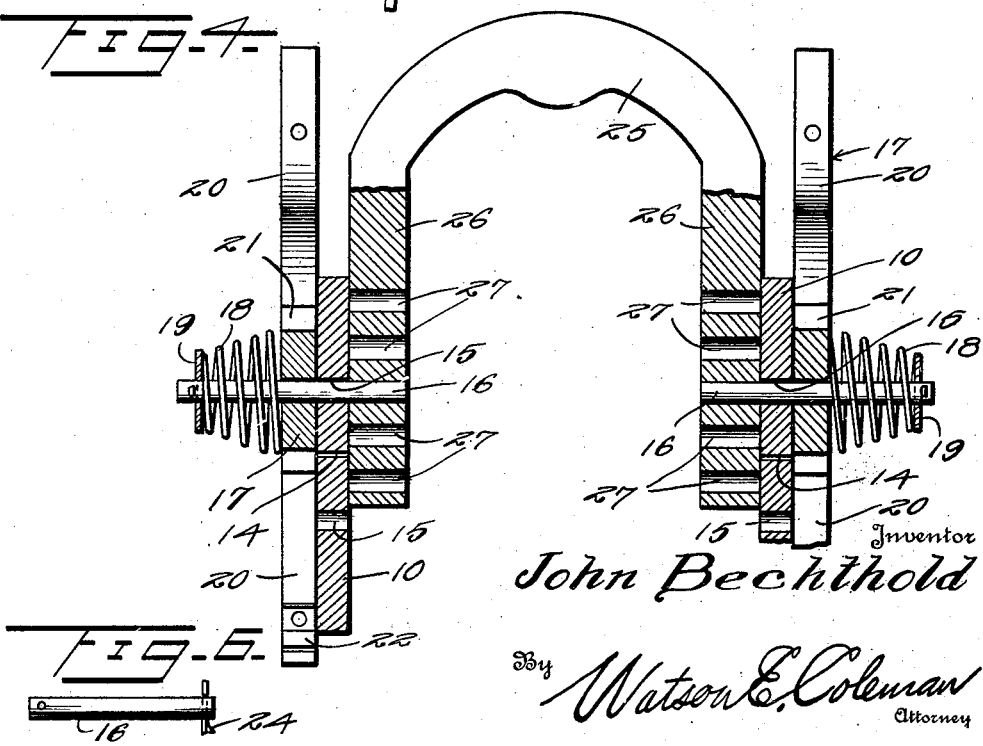
Inventor
John Bechthold
By Watson E. Coleman
Attorney Patented Apr. 10, 1928.

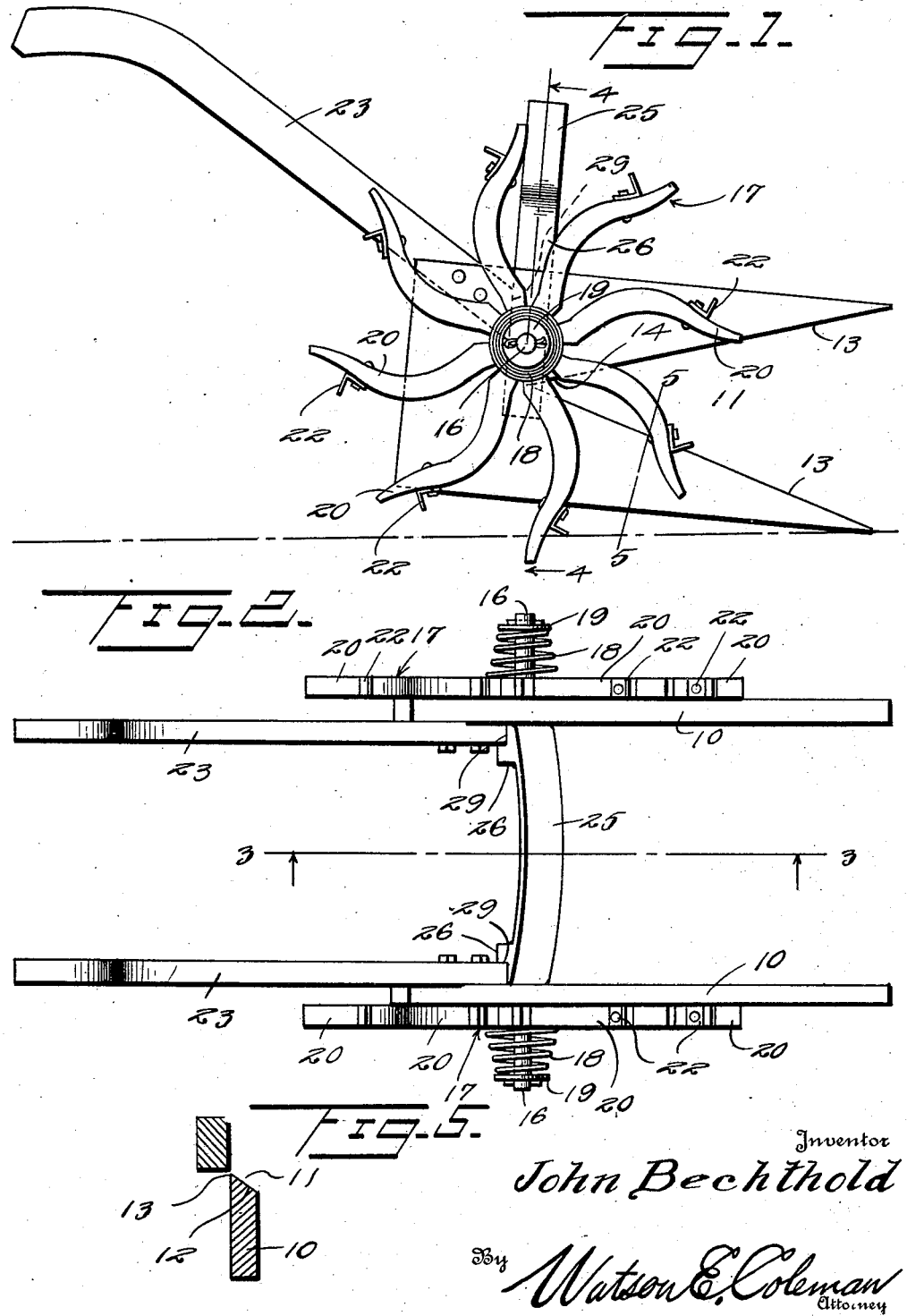

1,665,998

UNITED STATES PATENT OFFICE.

JOHN BECHTHOLD, OF ELMA, WASHINGTON, ASSIGNOR OF ONE-EIGHTH TO AUSTIN A. FOOTE AND ONE-EIGHTH TO JESSE L. PAINE, BOTH OF ELMA, WASHINGTON.

STRAWBERRY TOP AND RUNNER CUTTER.

Application filed December 21, 1926. Serial No. 156,188.

This invention relates to a strawberry top and runner cutter.

An important object of the invention is to provide a device of this character which may be employed to trim the runners and projecting top portions of strawberry plants either at a single or at opposite sides of a row.

A further object of the invention is to produce a device of this character which will trim these portions without pulling or dragging out the plants, so that the plants are disturbed and delayed in their growth.

A further object of the invention is to provide a combined lifting and severing blade and a spider wheel associated therewith and operated by movement of the device along the ground, which has such coaction with the blade that the vines are moved longitudinally of the blade, as the spider forces them into engagement with the blade, so that there is no pulling action upon the vines.

These and other objects I attain by the construction shown in the accompanying drawings, wherein for the purpose of illustration is shown a preferred embodiment of my invention and wherein:—

Figure 1 is a side elevation of a strawberry top and runner cutter constructed in accordance with my invention;

Figure 2 is a plan view thereof;

Figure 3 is a section on the line 3—3 of Figure 2;

Figure 4 is a section on the line 4—4 of Figure 1;

Figure 5 is an enlarged sectional view on the line 5—5 of Figure 1;

Figure 6 is a side elevation of the stub axle employed when a single plate is used.

Referring now more particularly to the drawings, the numeral 10 generally designates a plate which has formed in one end thereof a V-shaped notch 11. The walls of this notch are beveled toward one side of the plate, as indicated at 12, to provide relatively sharp cutting edges 13. This plate is vertically disposed and the edge in which the notch is formed provides one end edge of the plate. Formed in the plate above and below the apex 14 of the notch are openings 15 through one of which is directed a stub axle or pivot 16. Mounted upon this stub axle is a spider, generally designated at 17, which is disposed at that face of the plate bearing the cutting edges and which is held in engagement with the plate, by means of a spring 18 surrounding the stub axle 16 between the spider and a spring seat 19 carried by the outer end of the axle.

The opening 15 which is employed for the reception of the stub axle is always that opening most remote from the lower edge of the plate. The arms 20 of the spider are longitudinally curved in the direction of rotation of the spider when the plate is moved along the ground and the spider thus rotated by the engagement of the ground with the ends of the arms. The curvature is such that each arm in its coaction with the lower or effective cutting edge 13 always presents its edge to the cutting edge at an acute angle thereto, with the result that the point where the arm crosses the cutting edge is constantly moving rearwardly upon this cutting edge toward the base of the notch. Adjacent its inner end, each arm has an abrupt shoulder, which is substantially radial to the axis of the spider. A vine picked up by the point formed at the forward edge of the plate by the notch 11 moves longitudinally of the blade, assisted in its movement by its natural tendency to remain stationary and the impulse given it by the coacting arm of the spider. This arm longitudinally of the blade will ordinarily serve to sever the vine, but if it does not, when the vine arrives at the apex of the notch, the radially directed face 21 will engage thereagainst and act with the plate to shear the vine. At this time, the upper edge of the notch engages against projecting portions of the top of plants and moves them downwardly into the path of the arms of the spider wheel, so that they too may be severed. The arms 20 of the spider are preferably provided upon their rear faces or those faces which are rearwardly disposed, as regards the cutting edge during the coaction of the arm therewith and adjacent their outer ends, with outstanding ears 22, which will limit the depth to which the ends of the arms will penetrate in soft soil. A handle 23 is secured to the plate to provide a means for propelling the same along the ground.

In the single form, suitable means 24 are provided to prevent longitudinal shifting movement of the stub shaft through the plate 10. In the double form or that form adapted for simultaneous operation upon opposite sides of a row of plants, a U-shaped yoke 25 is provided, the arms 26 of which are each provided with a series of openings 27, for the reception of the inner ends of the stub axle and are further provided with means 28 for securing the stub axles in position in these openings. The arms of the yoke are preferably engaged by the ends of the handle, so that the yoke is maintained in its properly vertical position, as indicated at 29. The handles 23 are, of course, reversely engageable with the plate, so that either cutting edge 13 may be brought into play.

Since the construction hereinbefore set forth is capable of a certain range of change and modification without materially departing from the spirit of the invention, I do not limit myself to such specific structure except as hereinafter claimed.

I claim:—

1. In a strawberry runner cutter, a plate formed in one end thereof with a V-shaped notch opening through said end thereof, the plate at the edges of the notch being formed to provide cutting edges disposed at one face of the plate, a rotating spider operating against said face of the plate and having arms longitudinally curved in the direction of rotation of the spider, the curvature of the arms being such and the axis of rotation of the spider being so located with relation to the notch that the point of intersection of the edge of the notch by each arm of the spider as it passes across the notch travels longitudinally of the lower cutting edge of the notch toward the apex thereof, the end of the plate through which the notch opens extending in advance of the arms of the spider.

2. In a strawberry runner cutter, a plate formed in one end thereof with a V-shaped notch, the plate at the edges of the notch being formed to provide cutting edges disposed at one face of the plate, a rotating spider operating against said face of the plate and having arms longitudinally curved in the direction of rotation of the spider, the curvature of the arms being such and the axis of rotation of the spider being so located with relation to the notch that the point of intersection of the edge of the notch by each arm of the spider as it passes across the notch travels longitudinally of the lower cutting edge of the notch toward the apex thereof, the plate being vertically disposed, the ends of the arms of the spider projecting below the lower edge of the plate whereby the spider is rotated by engagement of said arms with the ground as the plate is moved along the ground and a yoke for connecting a pair of said plates to one another for operation upon opposite sides of a row of plants, said plates having handles attached thereto, the handles having engagement with the arms of the yoke maintaining the yoke in vertical position.

3. In a strawberry runner cutter, a plate formed with a V-shaped notch opening through one end thereof, the edges of the notch being formed to provide cutting edges disposed at one face of the plate, the plate being provided above and below the apex of the notch with openings for the interchangeable reception of a pivot, a rotating spider mounted upon said pivot and operating against the face of the plate which is provided with the cutting edges and having arms longitudinally curved in the direction of rotation of the spider, the end of the plate through which the notch opens extending in advance of the arms of the spider and a handle secured to the plate.

In testimony whereof I hereunto affix my signature.

JOHN BECHTHOLD.